Patented Mar. 27, 1951

2,546,936

UNITED STATES PATENT OFFICE 2,546,936

TREATMENT OF SLAGS

James C. Vignos, Canton, Ohio, assignor to Ohio Ferro-Alloys Corporation, Canton, Ohio, a corporation of Ohio No Drawing. Application June 2, 1949, Serial No. 96,823

5 Claims. (Cl. 75—30)

This invention relates to the treatment of slags and more particularly to the removal of phosphorus from slags resulting from iron and steelmaking operations. This application is a continuation-in-part of my application, Serial No. 606,873, filed July 24, 1945, now abandoned.

In the production of iron and steel of any desired quality from the usual wide range of raw materials such as iron and steel scrap, pig iron (cold or molten), it is necessary to remove the impurities, usually carbon, phosphorus, silicon, manganese, chromium, etc. These impurities are ordinarily removed by oxidation with air or metallic oxides such as iron ore, manganese ore, chrome ore, etc., depending upon the process and the impurities to be removed. Such oxidation procedures place the resulting impurity oxides in a suitable slag which is readily removed or separated from the molten metal. This slag contains the major portion of the sulfur, phosphorus, manganese and silicon of the original charge in the form of oxides as well as a considerable proportion of iron oxide.

Various methods have been suggested for treating the molten steelmaking slags to reduce the iron and manganese oxides, such as reduction with carbonaceous reducing agents or with noncarbonaceous reducing agents by a variety of methods. Such slags are a potentially rich source of manganese in particular. However, the suggested methods of salvaging manganese are so unsatisfactory that its recovery from these slags has not been economically feasible because in reducing the manganese oxides the iron, sulfur and phosphorus oxides are likewise reduced and the resulting metal is too high in phosphorus to find commercial application.

It has been my experience that the reduction of such slags and the removal of phosphorus can not be economically carried out in a refining furnace. Such methods of reduction as have been proposed are therefore economically undesirable and generally unsatisfactory in that the phosphorus must be subsequently removed from the metal by further refining processes. It has also been my experience that a reduction process using carbonaceous materials produces a reaction so endothermic in character that it must be carried out in a furnace. This requires the use of expensive equipment and has to a considerable extent prevented the recovery of manganese from slags.

I have discovered that the answer to the problem of manganese recovery from slags is to be found in fractionally separating the phosphorus from the slag as an iron-phosphorus alloy under certain conditions which I shall hereafter describe and then separating the manganese, instead of reducing the combined oxides of phosphorus, sulfur, iron, manganese, etc., and then attempting to separate the phosphorus from the resulting alloy.

I have found a method of fractionally separating phosphorus from molten slag outside of a furnace by the addition of a reducing agent which when added to the slag will react with the slag to maintain it in the molten condition and at the same time cause substantially continuous agitation of the slag during its reaction therewith and will, if added in the proper amounts, reduce the phosphorus oxide and sufficient iron oxide to combine with the phosphorus in the form of an iron-phosphorus alloy which may be readily separated from the remaining manganese oxide containing material. Most efficient separation may be had if the composition of the iron-phosphorus alloy has a melting point at or below the melting point of the slag. Preferably the composition of my reducing agent is adjusted so that it not only maintains the slag in the molten condition but also substantially maintains the thermodynamic balance of the slag. The remaining manganese oxide containing material may then be treated by any of the known reduction methods to produce a satisfactory manganese alloy.

A reducing agent which I have found to have the aforementioned required properties and to be most effective in my method is a mixture of carbonaceous and noncarbonaceous materials, preferably a mixture of carbonaceous material such as coke breeze and ferro-silicon. Ordinarily a mixture of about 40% carbonaceous material and 60% noncarbonaceous material will form a satisfactory reducing agent although these proportions may vary depending upon the composition of the slag and the nature of both the carbonaceous and noncarbonaceous material. Under certain conditions I have used as little as 5% carbonaceous reducing agent in combination with 95% noncarbonaceous reducing agent but generally the proportion of carbonaceous material should be larger. While I prefer to use ferro-silicon as the non-carbonaceous reducing agent, other noncarbonaceous reducing agents including aluminum, magnesium, calcium, and titanium and their alloys may be used.

A starter or initiator, such as sodium nitrate or other oxidant, may be added to the mixture to accelerate the reaction.

Example I

As an example of the process of my invention, 10 net tons of flush-off slag having the following composition,

| | Percent |
|---|---|
| FeO | 34.5 |
| $Fe_2O_3$ | 6 |
| MnO | 15.5 |
| $SiO_2$ | 22 |

| | Percent |
|---|---|
| CaO | 13 |
| MgO | 5.5 |
| Al₂O₃ | 2 |
| P₂O₅ | 1.5 | were treated with 1000 pounds of coke breeze, 1800 pounds of 77% ferro-silicon and 200 pounds of sodium nitrate as it flowed from the furnace into a ladle. An energetic reaction ensued during which the slag was continually agitated by the reaction and also remained in a satisfactory physical condition, i. e., it did not cool and solidify nor did it become overheated, wild and uncontrollable upon the addition of the treating materials. After the energetic reaction was completed, the iron-phosphorus alloy was tapped from the bottom of the ladle. Analysis of the approximately 5300 pounds of metal thus produced showed a concentration in the metal of about 2.26% phosphorus, or about 90% of the phosphorus originally in the slag.

*Example II*

In this example it was desired to remove about 90% of the iron along with the phosphorus in a flush-off slag having a composition similar to that of Example I. A net ton of molten slag was treated with 83 pounds of coke, 240 pounds of 75% ferro-silicon and 20 pounds of sodium nitrate to produce a metal having the following analysis:

| | Percent |
|---|---|
| Fe | 93.3 |
| P | 2.04 |
| Mn | 2.11 |
| C | 2.55 |

Analysis of the remaining manganese rich slag showed it to contain only 0.13% P₂O₅.

*Example III*

A net ton of slag similar to the composition of the slag of Example I was treated with a mixture of 10 pounds of coke and 177 pounds of 74% ferro-silicon. The resulting 500 pounds of metal contained 2.2% phosphorus or approximately 80% of the phosphorus in the slag and metallic iron equivalent to about 70% of the iron oxide in the slag.

While I have illustrated and described a present preferred practice of my invention, it will be understood that it may be otherwise embodied within the scope of the following claims.

I claim:

1. A process for removing phosphorus from slags containing phosphorus, manganese and iron oxides outside of a furnace to produce a substantially phosphorus-free manganese oxide containing material from which manganese may be recovered by known means which comprises treating the slag in the molten condition with a sufficient amount of a mixture of about 5% to 40% carbonaceous reducing agents and about 95% to 60% noncarbonaceous reducing agents to reduce the greater part of the phosphorus oxide and sufficient iron oxide to combine with the phosphorus in the form of an iron-phosphorus alloy and separating the iron-phosphorus alloy from the remaining manganese oxide containing material.

2. A process for removing phosphorus from slags containing phosphorus, manganese and iron oxides outside of a furnace to produce a substantially phosphorus-free manganese oxide containing material from which manganese may be recovered by known means which comprises treating the slag in the molten condition with a sufficient amount of a mixture of about 40% carbonaceous reducing agents and about 60% noncarbonaceous reducing agents to reduce the greater part of the phosphorus oxide and sufficient iron oxide to combine with the phosphorus in the form of an iron-phosphorus alloy and separating the iron-phosphorus alloy from the remaining manganese oxide containing material.

3. A process for removing phosphorus from slags containing phosphorus, manganese and iron oxide outside of a furnace to produce a substantially phosphorus-free manganese oxide containing material from which manganese may be recovered by known means which comprises treating the slag in the molten condition with a sufficient amount of a mixture of about 40% carbonaceous reducing agents, about 60% noncarbonaceous reducing agents, combined with an oxidant starter to reduce the greater part of the phosphorus oxide and sufficient iron oxide to combine with the phosphorus in the form of an iron-phosphorus alloy and separating the iron-phosphorus alloy from the remaining manganese oxide containing material.

4. A process for removing phosphorus from slags containing phosphorus, manganese and iron oxides outside of a furnace to produce a substantially phosphorus-free manganese oxide containing material which comprises treating the slag in the molten condition with a mixture of carbonaceous and noncarbonaceous reducing agents in such proportions that the molten condition of the slag is maintained and a substantially continuous agitation of the slag is maintained during its reaction therewith, said mixture being added in sufficient quantity to reduce the greater part of the phosphorus oxide and at least sufficient iron oxide to combine with the phosphorus in the form of an iron-phosphorus alloy and separating the iron-phosphorus alloy from the remaining slag.

5. A process for removing phosphorus from slags containing phosphorus, manganese, and iron oxides outside of a furnace to produce a substantially phosphorus-free manganese oxide containing material which comprises treating the slag in the molten condition with a mixture of carbonaceous and non-carbonaceous reducing agents and an oxidant starter in such proportions that the molten condition of the slag is maintained and a substantially continuous agitation of the slag is maintained during its reaction therewith, said mixture being added in sufficient quantity to reduce the greater part of the phosphorus oxide and at least sufficient iron to combine with the phosphorus in the form of an iron-phosphorus alloy and separating the iron-phosphorus alloy from the remaining slag.

JAMES C. VIGNOS.

REFERENCES CITED

The following references are of record in the file of this patent:

UNITED STATES PATENTS

| Number | Name | Date |
|---|---|---|
| 905,281 | Betts | Dec. 1, 1908 |
| 1,023,070 | Hiorth | May 28, 1912 |
| 2,350,725 | Cavanagh | June 6, 1944 |
| 2,471,562 | Fitterer | May 31, 1949 |